(12) United States Patent
Song et al.

(10) Patent No.: US 11,697,375 B2
(45) Date of Patent: Jul. 11, 2023

(54) PORTABLE STORAGE DEVICE

(71) Applicants: HYUNDAI MOTOR COMPANY, Seoul (KR); KIA CORPORATION, Seoul (KR)

(72) Inventors: Hyun Song, Hwaseong-si (KR); Do Yeon Kim, Hwaseong-si (KR); Yeon Hee Jang, Hwaseong-si (KR); Eun Bi Cho, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/373,171

(22) Filed: Jul. 12, 2021

(65) Prior Publication Data

US 2022/0153199 A1    May 19, 2022

(30) Foreign Application Priority Data

Nov. 13, 2020  (KR) ........................ 10-2020-0151635

(51) Int. Cl.
*B60R 5/04* (2006.01)
*B60R 16/033* (2006.01)
*B62J 9/27* (2020.01)

(52) U.S. Cl.
CPC .............. *B60R 5/04* (2013.01); *B60R 16/033* (2013.01); *B62J 9/27* (2020.02)

(58) Field of Classification Search
CPC ............. B60R 5/04; B60R 16/033; B62J 9/27
See application file for complete search history.

(56) References Cited

U.S. PATENT DOCUMENTS

| | | | |
|---|---|---|---|
| 6,264,261 B1* | 7/2001 | Krafcik | B60R 7/04 297/256.16 |
| 7,591,498 B2* | 9/2009 | Busha | B60N 3/101 224/281 |
| 10,793,105 B1* | 10/2020 | Baumbick | B60R 25/102 |
| 2008/0073396 A1* | 3/2008 | Chiang | B62J 9/30 280/202 |
| 2009/0066103 A1* | 3/2009 | Koarai | B60N 2/753 296/1.09 |
| 2013/0008930 A1* | 1/2013 | Hipshier | B60R 7/04 224/275 |
| 2014/0021232 A1* | 1/2014 | Lazarevich | B60R 7/04 224/539 |

FOREIGN PATENT DOCUMENTS

KR    10-0157262 B1    11/1998

* cited by examiner

*Primary Examiner* — Derek J Battisti
(74) *Attorney, Agent, or Firm* — McDonnell Boehnen Hulbert & Berghoff LLP

(57) ABSTRACT

The present disclosure provides a portable storage device. The portable storage device includes a stay unit mounted on a personal vehicle or a general vehicle, a storage unit, which is portable and is selectively mounted on the stay unit, and a coupling unit, which is disposed at the stay unit so as to couple the storage unit to the stay unit.

7 Claims, 8 Drawing Sheets

PORTABLE STORAGE DEVICE

CROSS REFERENCE TO RELATED APPLICATIONS

This application claims under 35 U.S.C. § 119(a) the benefit of priority to Korean Patent Application No. 10-2020-0151635 filed on Nov. 13, 2020, the entire contents of which are incorporated herein by reference.

BACKGROUND

(a) Technical Field

The present disclosure relates to a portable storage device. More particularly, it relates to a portable storage device, which is capable of being selectively coupled to a personal vehicle or a general vehicle and of being applied to various uses.

(b) Background Art

Vehicles for various uses have been developed and made commercially available. In recent years, various kinds of personal vehicles for one-person transportation have been developed and made commercially available.

A way of traveling in which a person travels from one point to another using a general vehicle and then the person travels to the destination using a personal vehicle is recently attracting a lot of attention.

In other words, rather than a conventional travel way in which a person travels from a starting point to the destination using only a general vehicle, a travel way in which a person travels from a starting point to a halfway point, which is positioned near the destination or which can be reached using public transportation, and then travels to the destination using a personal vehicle is being established.

However, when a person travels using a personal vehicle, the personal vehicle is incapable of accommodating baggage because the personal vehicle is not provided with a large space such as that in a general vehicle. Furthermore, it is cumbersome to transfer the baggage to a personal vehicle from a general vehicle.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to solve the above-described problems associated with the prior art. It is an object of the present disclosure to provide a portable storage device, which is compatible with and applicable to a personal vehicle and a general vehicle.

It is another object of the present disclosure to provide a portable storage device, which includes a storage unit that has various functions and is usable in various kinds of personal vehicles.

The objects of the present disclosure are not limited to the above-mentioned objects, and other objects of the present disclosure, which are not mentioned above, will be clearly understood from the following descriptions of preferred embodiments, and will be apparent from the preferred embodiments of the present disclosure. The above objects and other objects of the present disclosure are achieved by the means and combinations thereof disclosed in the claims.

In one aspect, the present disclosure provides a portable storage device including a stay unit mounted on a personal vehicle or a general vehicle, a storage unit, which is portable and is selectively mounted on the stay unit, and a coupling unit, which is disposed at the stay unit so as to couple the storage unit to the stay unit.

In a preferred embodiment, the coupling unit may include an electrode member electrically connected to a battery disposed in the storage unit.

In another preferred embodiment, the storage unit may include an illumination unit capable of emitting light by itself, a speaker for outputting sound to an outside, and a handle for allowing the storage unit to be carried by a user.

In still another preferred embodiment, the storage unit may include a first expansion space, which is expandable in a longitudinal direction of the storage unit, and a second expansion space, which is expandable in a transverse direction of the storage unit.

In yet another preferred embodiment, the coupling unit may include a fitting portion, into which one end of the storage unit is fitted, and a clip portion, in which a remaining end of the storage unit is engaged so as to surround at least a portion of the storage unit.

In still yet another preferred embodiment, the coupling unit may include a slot, formed in the stay unit into which at least a portion of the storage unit is fitted, and a guide portion, which is provided at the storage unit and is fitted into the slot formed in the stay unit.

In a further preferred embodiment, the coupling unit may include a holding pin, provided at the bottom of the stay unit so as to surround at least a portion of a lateral side surface of the storage unit, and a groove formed in the storage unit in which the holding pin is engaged.

In another further preferred embodiment, the coupling unit may include a fastening member, which is provided at the storage unit so as to fasten at least a portion of the storage unit and the stay unit concurrently.

In still another further preferred embodiment, the storage unit may include a recess formed in an upper surface thereof.

In yet another further preferred embodiment, the recess may be provided therein with a cup holder or an air cleaner coupled thereto.

In still yet another further preferred embodiment, the stay unit may include a plurality of stay units, which are provided with respective coupling units so as to accommodate a plurality of storage units.

In a still further preferred embodiment, the storage unit may include a battery disposed therein, a connecting member adapted to allow power to be supplied to the battery, and a storage region formed in a predetermined region thereof.

In another aspect, the present disclosure provides a portable storage device including a stay unit disposed at a vehicle, and a coupling unit disposed at the stay unit so as to provide the stay unit with a storage region, the coupling unit including lateral walls provided at two lateral sides of a bottom of the stay unit, and a convenience member, which is movably provided in the storage region defined by the bottom and the lateral walls.

In a preferred embodiment, the convenience member may include an armrest, slidably provided in the storage region, and a cup holder, provided at one end of the armrest.

In another preferred embodiment, the convenience member may be constructed so as to be capable of rotating and sliding with respect to the lateral walls.

Other aspects and preferred embodiments of the disclosure are discussed infra.

It is to be understood that the term "vehicle" or "vehicular" or other similar term as used herein is inclusive of motor vehicles in general, such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example a vehicle powered by both gasoline and electricity.

BRIEF DESCRIPTION OF THE FIGURES

The above and other features of the present disclosure will now be described in detail with reference to certain exemplary embodiments thereof, illustrated in the accompanying drawings which are given hereinbelow by way of illustration only, and thus are not limitative of the present disclosure, and wherein.

Figure 1:
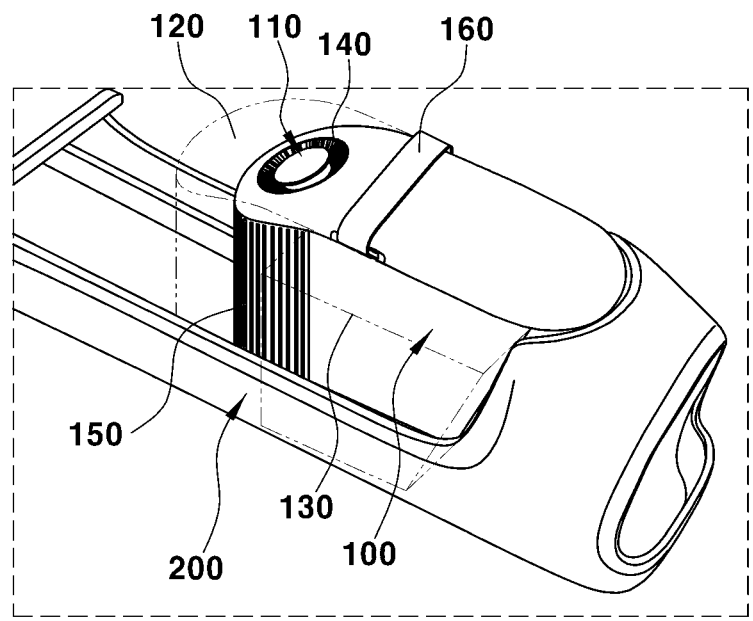
FIG. 1 is a perspective view illustrating a portable storage device according to an embodiment of the present disclosure, which is mounted in a general vehicle.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, the reference numbers refer to the same or equivalent parts of the present disclosure throughout the several figures of the drawing.

DETAILED DESCRIPTION

Hereinafter, embodiments of the present disclosure will be described in detail with reference to the accompanying drawings. The embodiments of the present disclosure may be modified into various forms, and the scope of the present disclosure should not be construed as being limited to the following embodiments. These embodiments are provided so that this disclosure will be thorough and complete, and will fully convey the scope of the disclosure to those skilled in the art.

The term "part", "unit", or "module" means a unit for performing at least one function or action, and may be realized by hardware or a combination of hardware.

It will be understood that, although the terms "first", "second", etc. may be used herein to describe various similar elements, these elements should not be construed to be limited by these terms. These terms are only used to distinguish one element from another.

Hereinafter, embodiments of the present disclosure will be described in detail with reference to the accompanying drawings. In the description on the basis of the drawings, the same or equivalent components may be denoted by the same reference numbers, and a description thereof will not be repeated.

In the description, the term "personal vehicle" means a personal mobility vehicle, such as a scooter and an electric scooter, on which one or two persons can ride, and which can be folded and stored or carried and moved by a user.

FIG. 1 is a view illustrating a portable storage device 10 according to an embodiment of the present disclosure, which is mounted in a general vehicle.

The portable storage device 10 according to an embodiment of the present disclosure may include a storage unit 100, and a stay unit 200 which is placed in an area of a vehicle in which a console is positioned. The stay unit 200 may be positioned in the space between front seats, and may include a region corresponding to the size of the storage unit 100.

The stay unit 200 may be constructed so as to enable one or more storage units 100 to be seated thereon, and may be provided with a coupling unit 300.

The storage unit 100 may include a storage chamber, adapted to receive objects therein, an illumination portion 140, which emits light from at least a portion thereof, and a speaker portion 150, which is connected to a user's smartphone or portable device so as to output the sound from the device to the outside. The speaker portion 150 and the illumination portion 140 may be preferably connected to a battery positioned in the storage unit 100 so as to receive power therefrom. The storage unit 100 equipped with the battery may drive a compressor provided in the storage unit 100 in order to serve as a vacuum cleaner, and may include a condenser, through which refrigerant flows, in order to serve as a portable refrigerator.

Furthermore, the storage unit 100 may include an upper cover adapted to open and close the upper surface thereof, or a front cover adapted to open and close the front surface thereof. The storage unit 100 may include a handle, which is positioned at a portion of the upper end or the rear and side end of the storage unit 100 so as to improve portability by a user.

Furthermore, the storage unit 100 may include a pair of straps, which are coupled to two ends of the storage unit 100 so as to enable the storage unit 100 to be used as a backpack.

The storage unit 100 may include a first expansion space 120, which is expandable in a longitudinal direction of a vehicle, and a second expansion space 130, which is expandable in a transverse direction of the vehicle. According to an embodiment of the present disclosure, to provide the expansion spaces, the storage unit 100 may be constructed such that a lateral wall or a front or rear wall, which is received in the housing of the storage unit 100, is extended outwards, whereby the internal space in the storage unit 100 is expanded.

The storage unit 100 may include a recess 110, which is formed by depressing at least one surface thereof inwards, for use as a cup holder. The recess 110 is preferably positioned at the upper surface of the storage unit 100. In another embodiment of the present disclosure, the recess 110 may be electrically connected to the battery disposed in the storage unit 100 such that the power of the battery is applied to an air cleaner received in the recess 110.

Furthermore, the recess 110 may be formed in a wider region of the storage unit 100 so as to serve as a vehicular cage for a pet. Accordingly, the storage unit 100, which is removed from a vehicle, may be used as a transport gage for a pet.

In another embodiment of the present disclosure, the storage unit 100 may be constructed from a collapsible material. In this case, the outermost shell of the storage unit 100 may be made of a flexible material, and a link unit for guiding the collapse of the storage unit 100 may be positioned at the inner surface of the outermost shell. Accordingly, the portability of the collapsed storage unit 100 may be improved. Furthermore, when the storage unit 100 is mounted on a vehicle, the storage unit 100 may be expanded by virtue of the link unit so as to ensure a sufficient space.

The portable storage device may include a coupling unit 300 (shown in FIG. 4), which is provided between the storage unit 100 and the stay unit 200 so as to hold the storage unit 100 on the stay unit 200. The coupling unit 300 may include an electrode member 330, which is configured to electrically connect the battery provided in the storage unit 100 to the vehicle. The electrode member 330 may be brought into electrical contact with a connecting member 190 provided at the storage unit 100 such that power from the vehicle is applied to the battery via the connecting member 190 of the storage unit 100.

The coupling unit 300 may be provided at the stay unit 200 or the storage unit 100. The electrodes of the stay unit 200 may be connected to the electrodes of the storage unit 100. Furthermore, the controller of the vehicle may be connected to the controller of the storage unit 100 so as to perform wired communication.

Figure 2A:
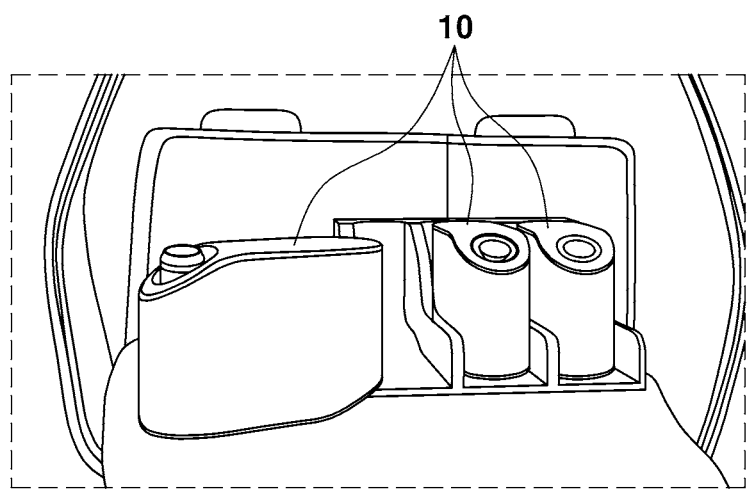
FIG. 2A illustrates an embodiment of the present disclosure in which the portable storage unit is provided in a luggage compartment in a general vehicle.
Figure 2B:
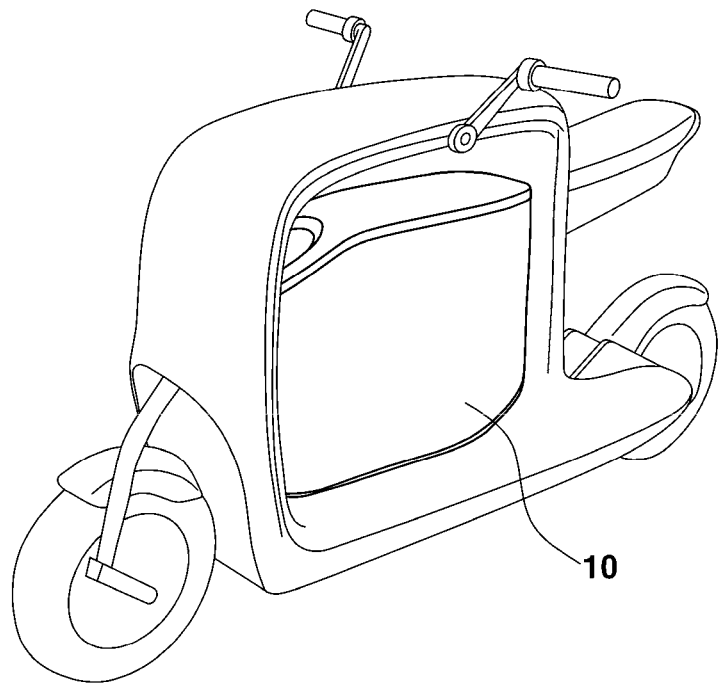
FIG. 2B illustrates another embodiment of the present disclosure in which the personal storage device is provided in a personal vehicle.
Figure 2C:
FIG. 2C illustrates a further embodiment of the present disclosure in which the personal storage device is provided in a personal vehicle capable of being carried by a user.

FIGS. 2A to 2C illustrate positions of various vehicles at which the storage unit 100 is mountable.

FIG. 2A illustrates an embodiment of the present disclosure in which the stay unit 200 is provided in a luggage compartment in a vehicle. In this embodiment, the storage unit 100 may be coupled to at least one stay unit 200 provided in the luggage compartment in the vehicle.

Alternatively, FIGS. 2B and 2C illustrate other embodiments in which the storage unit 100 is mounted on different personal vehicles.

FIG. 2B illustrates a personal scooter in which the stay unit 200 is positioned at at least a portion of the scooter and the storage unit 100 is coupled to the stay unit 200 for transportation.

FIG. 2C illustrates a personal vehicle such as an electrical scooter in which the stay unit 200 is provided on a steering shaft and the storage unit 100 is coupled to the stay unit 200 for transportation.

In this way, the storage unit 100 may be selectively mounted at various positions in vehicles equipped with the stay units 200.

Figure 3:
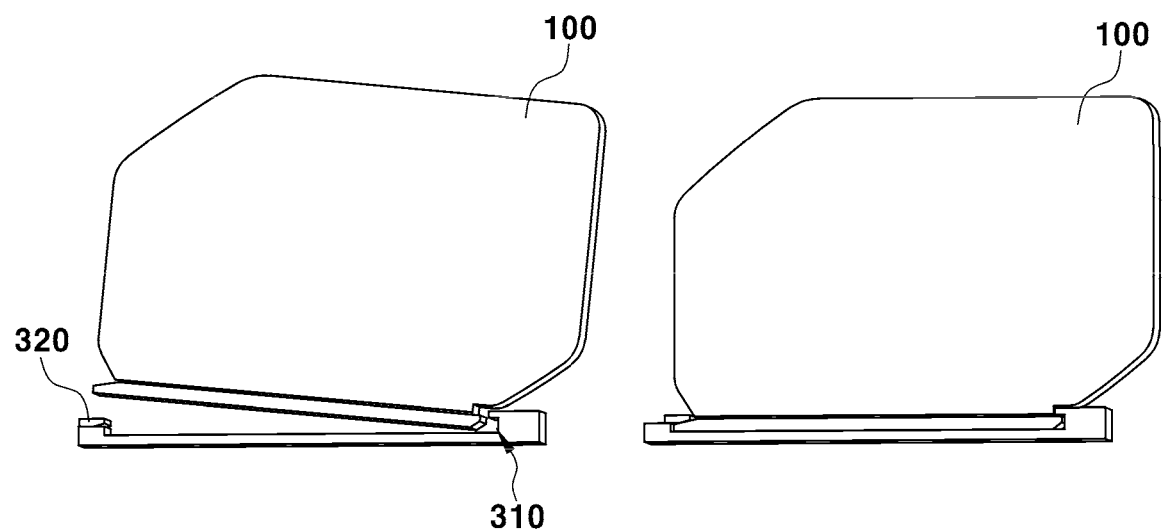
FIG. 3 illustrates an embodiment of the present disclosure in which the portable storage is coupled to a coupling unit.
Figure 4:
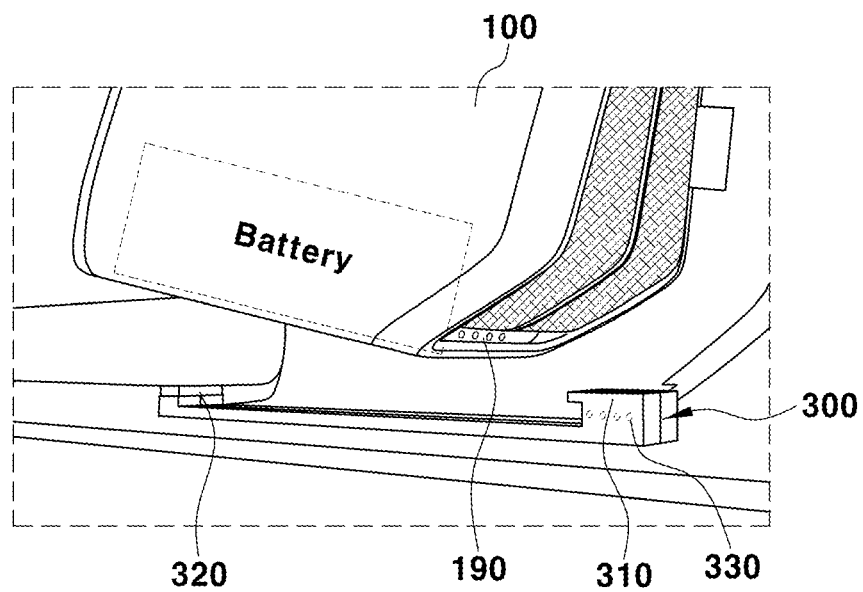
FIG. 4 illustrates an electrode member of the portable storage device according to an embodiment of the present disclosure, which is coupled to the coupling unit.

FIG. 3 illustrates a coupling structure of the coupling unit 300 according to an embodiment of the present disclosure. FIG. 4 is an enlarged view illustrating the coupling unit 300 including the electrode member 330.

The coupling unit 300, which is provided at the stay unit 200, may be constructed so as to be coupled to front and rear ends of the storage unit 100. Here, a guide portion, positioned at one end of the storage unit 100, is fitted and held in a fitting portion 310 positioned at one end of the stay unit 200, and a clip portion 320 is slidably provided at a position at which the other end of the storage unit 100 is coupled to the other end of the stay unit 200.

The fitting portion 310 may be provided with the electrode member 330 such that electrodes provided in the fitting portion 310 are positioned so as to correspond to electrodes provided at one end of the storage unit 100.

In another embodiment of the present disclosure, the coupling unit 300 may be constructed such that at least one holding pin 350 is provided on the upper surface of the stay unit 200 and such that the storage unit 100, which is mounted on the upper surface of the stay unit 200, is provided with a groove 180 which is engaged with the holding pin 350.

Furthermore, the portable storage device according to an embodiment of the present disclosure may include a fastening member 360, which is provided at the storage unit 100 or the stay unit 200 so as to fasten at least a portion of the storage unit 100 to the stay unit 200 simultaneously, thereby preventing the storage unit 100 from being spaced apart from the stay unit 200.

Figure 5A:
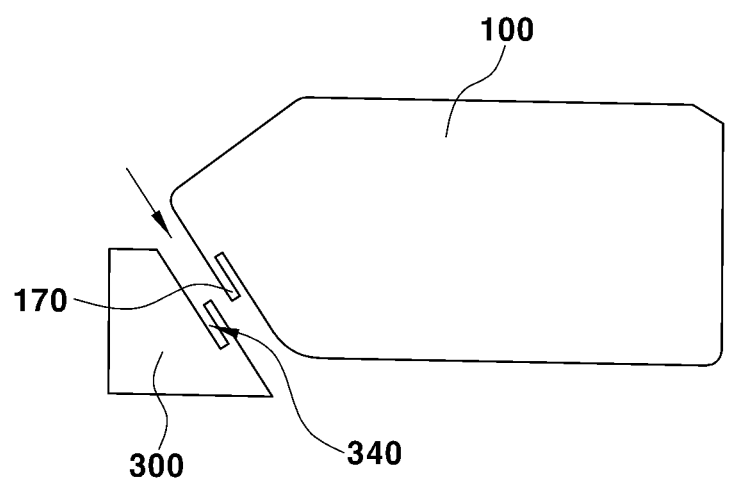
FIG. 5A illustrates a coupling structure between the coupling unit and the storage unit of the portable storage device according to the present disclosure.
Figure 5B:
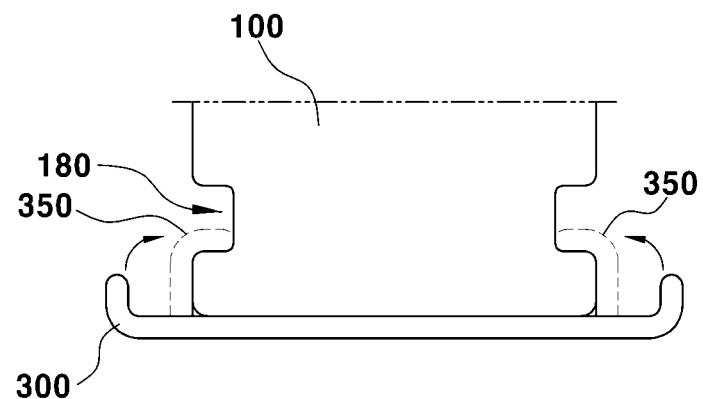
FIG. 5B illustrates another coupling structure between the coupling unit and the storage unit of the portable storage device according to the present disclosure.
Figure 5C:
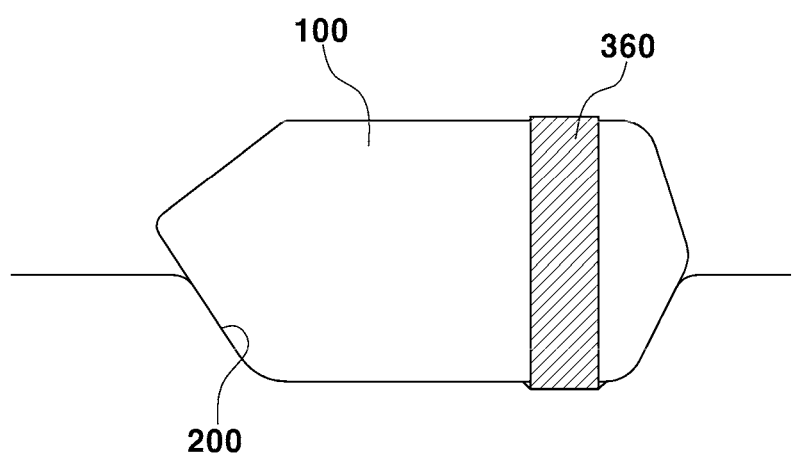
FIG. 5C illustrates a further coupling structure between the coupling unit and the storage unit of the portable storage device according to the present disclosure.

FIGS. 5A to 5C are cross-sectional views illustrating various kinds of coupling units 300.

In the coupling unit 300 shown in FIG. 5A, a guide portion 170 may be formed at the storage unit 100 so as to correspond to a sloping slot 340 in the coupling unit 300 such that the guide portion 170 is fitted into the sloping slot 340 when the storage unit 100 moves along the sloping surface of the coupling unit 300.

In the coupling unit 300 shown in FIG. 5B, at least one holding pin 350 may be provided on the upper surface of the stay unit 200 so as to be rotated in a direction perpendicular to the upper surface of the stay unit 200. Accordingly, one end of the holding pin 350 may be engaged and held in a groove 180 formed in the storage unit 100.

In the coupling unit 300 shown FIG. 5C, a fastening member 360 provided at the stay unit 200 fastens the storage unit 100 to the stay unit 200. Specifically, a pair of fasteners of the fastening member 460 are fixed to two sides of the stay unit 200, and the ends of the fasteners are fastened to each other on the upper surface of the stay unit 200.

In another embodiment, the fastening member 360 may be embodied as a rotating pin. In this case, the rotating pin is coupled to at least one end of the storage unit 100, and is rotatable so as to fasten the storage unit 100 to the stay unit 200.

Figure 5D:
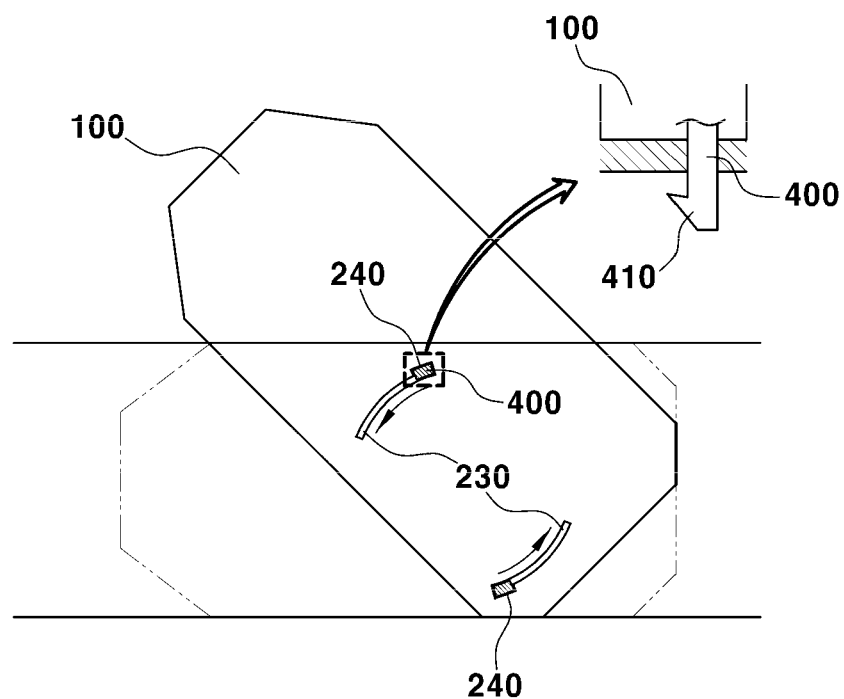
FIG. 5D illustrates a rotatable coupling structure between the coupling unit and the storage unit of the portable storage device according to the present disclosure.

FIG. 5D illustrates the storage unit 100, which is rotatable so as to be coupled to the coupling unit 300 provided at the stay unit 200.

The storage unit 100 may include two projections 400, which are inserted into two slots 230 formed in the coupling unit 300 so as to be rotatably moved along the slots 230. When the projections 400 are positioned at the ends of the slots 230, the storage unit 100 may be coupled and held to the coupling unit 300.

Two or more slots 230 may be formed in the stay unit 200, each having an arched shape such that the projections 400 are moved along the slots 230. In order to prevent the projections 400 from being separated outwards from the slots 230, the end of each of the projections 400, which are to be inserted into the slots 230, may be provided with a barb portion 410 which has a thickness greater than the width of the slot 230. The barb portion 410 of the projection 400 may be inserted into the starting end of the slot 230. To this end, the starting end of the slot 230 may be provided with an introduction inlet 240, into which the barb portion 410 of the projection 400 is inserted.

In the embodiment shown in the drawing, the storage unit 100 may be initially positioned at a predetermined angle with respect to the stay unit 200. At this time, the barb portions 410 of the projections 400 may be inserted into the slots 230 through the introduction inlets 240. Subsequently, when the storage unit 100 is rotated so as to be aligned with the stay unit 200, the storage unit 100 may be maintained in the stay unit 200 in the stationary state.

Figure 6:
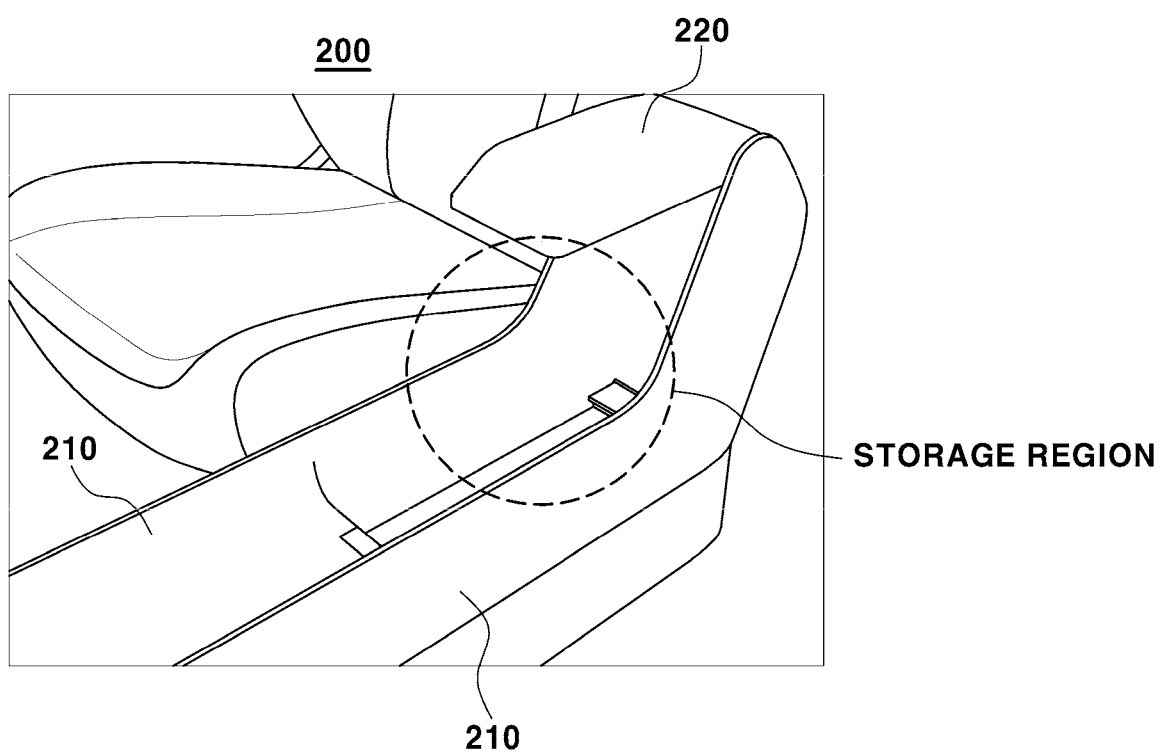
FIG. 6 illustrates a storage region in the stay unit, which is defined by the coupling unit, according to the present disclosure.

FIG. 6 illustrates a mounting region of a vehicle in which the stay unit 200 according to an embodiment of the present disclosure is provided.

As illustrated in the drawing, the stay unit 200 may include lateral walls 210, which extend upwards from two sides of the stay unit 200, and a convenience member 220, which is positioned at the rear end of the stay unit 200 and is selectively movable vertically along the lateral walls 210. The convenience member 220 may be positioned at the upper end of a storage region, and may be slidable toward the front end from the rear surface of the stay unit 200.

The convenience member 220 may include an armrest, which is positioned at the upper end of the storage region, and at least one cup holder provided at one end thereof. Preferably, the convenience member 200 may be constructed such that at least a portion thereof is movable to the upper end of the storage region along rails positioned at the rear and upper end of the stay unit 200. Furthermore, the convenience member 200 may be rotated with respect to the lateral walls 210, and may be slidable.

Furthermore, the convenience member 220 may be constructed such that one end thereof close to the storage region is rotated and opened toward the rear end of the stay unit 200 in the longitudinal direction of a vehicle.

By virtue of the above-described constructions of the embodiments and combinations thereof, the present disclosure offers the following effects.

Since the portable storage device according to the present disclosure includes the storage unit, which is usable in various circumstances, there is an effect of improving convenience in use.

Since the portable storage device according to the present disclosure is provided with various types of coupling units, there is an effect of securely holding the storage unit.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

The invention claimed is:

1. A portable storage device comprising: a stay unit mounted on a vehicle; a portable storage unit mounted on the stay unit; and a coupling unit disposed on the stay unit configured to couple the storage unit to the stay unit; wherein the coupling unit includes an electrode member electrically connected to a battery disposed in the storage unit; wherein the storage unit includes: an illumination unit capable of emitting light; a speaker for outputting sound to an outside; a handle for allowing the storage unit to be carried by a user; a connecting member adapted to allow power to be supplied to the battery; and a storage region formed in a predetermined region thereof; wherein the storage unit is constructed from a collapsible material, an outermost shell of the storage unit is made of a flexible material; wherein the vehicle includes a personal vehicle, on which one or two persons can ride; wherein the stay unit is located adjacent to a steering shaft of the personal vehicle; wherein the coupling unit includes a fastening member provided in the storage unit to fasten at least a portion of the storage unit to the stay unit; and wherein the storage unit includes: a first expansion space expandable in a longitudinal direction of the storage unit; and a second expansion space expandable in a transverse direction of the storage unit.

2. The portable storage device of claim 1, wherein the coupling unit includes:
   a fitting portion into which one end of the storage unit is fitted; and
   a clip portion, in which a second end of the storage unit is engaged so as to surround at least a portion of the storage unit.

3. The portable storage device of claim 1, wherein the coupling unit includes:
   a slot formed in the stay unit into which at least a portion of the storage unit is fitted; and
   a guide portion provided in the storage unit and fitted into the slot formed in the stay unit.

4. The portable storage device of claim 1, wherein the coupling unit includes:
   a holding pin provided at the bottom of the stay unit so as to surround at least a portion of a lateral side surface of the storage unit; and
   a groove formed in the storage unit in which the holding pin is engaged.

5. The portable storage device of claim 1, wherein the storage unit includes a recess formed in an upper surface thereof.

6. The portable storage device of claim 5, wherein the recess includes a cup holder or an air cleaner coupled thereto.

7. The portable storage device of claim 1, wherein the stay unit includes a plurality of stay units which are provided with respective coupling units to accommodate a plurality of storage units.

* * * * *